(12) United States Patent
Tachibana et al.

(10) Patent No.: US 8,859,118 B2
(45) Date of Patent: Oct. 14, 2014

(54) PERPENDICULAR MAGNETIC RECORDING MEDIUM

(75) Inventors: Toshiaki Tachibana, Singapore (SG); Takahiro Onoue, Singapore (SG)

(73) Assignee: WD Media (Singapore) Pte. Ltd., Singapore (SG)

(*) Notice: Subject to any disclaimer, the term of this patent is extended or adjusted under 35 U.S.C. 154(b) by 320 days.

(21) Appl. No.: 12/987,704

(22) Filed: Jan. 10, 2011

(65) Prior Publication Data

US 2011/0171495 A1   Jul. 14, 2011

(30) Foreign Application Priority Data

Jan. 8, 2010   (JP) .................... 2010-003359

(51) Int. Cl.
*G11B 5/66*   (2006.01)
*G11B 5/73*   (2006.01)
*G11B 5/84*   (2006.01)
*G11B 5/851*  (2006.01)

(52) U.S. Cl.
CPC ............ *G11B 5/8404* (2013.01); *G11B 5/851* (2013.01); *G11B 5/7325* (2013.01); *G11B 5/66* (2013.01)
USPC ........................................... 428/831

(58) Field of Classification Search
USPC ................. 428/831, 831.2; 360/135
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |

(Continued)

FOREIGN PATENT DOCUMENTS

| | | | |
|---|---|---|---|
| JP | 2006024346 | * | 1/2006 |
| JP | 2006085742 | | 3/2006 |

OTHER PUBLICATIONS

Oikawa et al., "Microstructure and magnetic properties of CoPtCr-SiO2 perpendicular recording media," Sep. 2002, IEEE Transactions on Magnetics, vol. 38, issue 5, part 1, p. 1976-1978.*

(Continued)

*Primary Examiner* — Holly Rickman (57) ABSTRACT

An object is to provide a perpendicular magnetic recording medium including a ground layer that prevents corrosion, while achieving a primary object of promoting finer magnetic particles of a magnetic recording layer and isolation of these magnetic particles.
The structure of a perpendicular magnetic recording medium 100 according to the present invention includes, at least on a base 110: a magnetic recording layer 122 on which a signal is recorded; a ground layer 118 provided below the magnetic recording layer; a non-magnetic layer 116 for controlling crystal orientation of the ground layer; and a soft magnetic layer 114 provided below the non-magnetic layer. The ground layer 118 is configured to have three layers including, in an order from bottom, a first ground layer 118a and a second ground layer 118b that contain ruthenium, and a third ground layer 118c that contains a metal. A gas pressure at film formation by sputtering for the second ground layer 118b is the highest among those for the above three layers.

26 Claims, 3 Drawing Sheets

(56) References Cited

U.S. PATENT DOCUMENTS

| | | | |
|---|---|---|---|
| 6,143,375 | A | 11/2000 | Ross et al. |
| 6,145,849 | A | 11/2000 | Bae et al. |
| 6,146,737 | A | 11/2000 | Malhotra et al. |
| 6,149,696 | A | 11/2000 | Jia |
| 6,150,015 | A | 11/2000 | Bertero et al. |
| 6,156,404 | A | 12/2000 | Ross et al. |
| 6,159,076 | A | 12/2000 | Sun et al. |
| 6,164,118 | A | 12/2000 | Suzuki et al. |
| 6,200,441 | B1 | 3/2001 | Gornicki et al. |
| 6,204,995 | B1 | 3/2001 | Hokkyo et al. |
| 6,206,765 | B1 | 3/2001 | Sanders et al. |
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,778,353 | B1 | 8/2004 | Harper |
| 6,795,274 | B1 | 9/2004 | Hsieh et al. |
| 6,830,837 | B2 * | 12/2004 | Kanbe et al. ............... 428/811.2 |
| 6,855,232 | B2 | 2/2005 | Jairson et al. |
| 6,857,937 | B2 | 2/2005 | Bajorek |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |
| 8,101,054 | B2 | 1/2012 | Chen et al. |
| 8,125,723 | B1 | 2/2012 | Nichols et al. |
| 8,125,724 | B1 | 2/2012 | Nichols et al. |
| 8,137,517 | B1 | 3/2012 | Bourez |
| 8,142,916 | B2 | 3/2012 | Umezawa et al. |
| 8,163,093 | B1 | 4/2012 | Chen et al. |
| 8,171,949 | B1 | 5/2012 | Lund et al. |
| 8,173,282 | B1 | 5/2012 | Sun et al. |

(56) References Cited

U.S. PATENT DOCUMENTS

| | | |
|---|---|---|
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0231608 A1* | 10/2007 | Mukai .................. 428/828.1 |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0204933 A1* | 8/2008 | Hailu et al. ................. 360/135 |
| 2008/0292908 A1* | 11/2008 | Mukai ..................... 428/831 |
| 2009/0116137 A1* | 5/2009 | Takekuma et al. ............. 360/75 |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0296278 A1* | 12/2009 | Inamura et al. ............. 360/135 |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0296200 A1* | 11/2010 | Iwasaki ..................... 360/294 |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0154948 A1* | 6/2012 | Tamai et al. ..................... 360/75 |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |

(56) References Cited

U.S. PATENT DOCUMENTS

2014/0011054 A1 1/2014 Suzuki
2014/0044992 A1 2/2014 Onoue
2014/0050843 A1 2/2014 Yi et al.

OTHER PUBLICATIONS

Japanese Office Action dated Feb. 4, 2014 for related Japanese Application No. 2010-003359, 5 pages.

* cited by examiner

| | GAS PRESSURE | | ELECTRICAL CHARACTERISTIC | RELIABILITY | OVERALL |
|---|---|---|---|---|---|
| | SECOND GROUND LAYER 118b | THIRD GROUND LAYER 118c | | | |
| FIRST EXAMPLE | 1.5 (HIGH) | 1.0 (LOW) | ○ | ○ | ○ |
| SECOND EXAMPLE | 1.6 (HIGH) | 1.0 (LOW) | ○ | ○ | ○ |
| THIRD EXAMPLE | 1.7 (HIGH) | 1.0 (LOW) | ○ | ○ | ○ |
| FIRST COMPARATIVE EXAMPLE | 1.0 (LOW) | 1.5 (HIGH) | ○ | × | × |
| SECOND COMPARATIVE EXAMPLE | 1.5 (HIGH) | 1.5 (HIGH) | ○ | × | × |
| THIRD COMPARATIVE EXAMPLE | 1.0 (LOW) | 1.0 (LOW) | × | ○ | × |

PERPENDICULAR MAGNETIC RECORDING MEDIUM

TECHNICAL FIELD

The present invention relates to a perpendicular magnetic recording medium to be mounted an HDD (hard disk drive) or the like of a perpendicular magnetic recording type.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 200 gigabytes per perpendicular magnetic recording medium with a 2.5-inch diameter for use in an HDD or the like has been desired. To fulfill such demands, an information recording density exceeding 400 gigabits/inch square is desired to be achieved.

To attain a high recording density in a magnetic recording medium for use in an HDD or the like, a perpendicular magnetic recording type has been suggested in recent years. In a perpendicular magnetic recording medium for use in the perpendicular magnetic recording type, the axis of easy magnetization of a magnetic recording layer is adjusted so as to be oriented in a direction perpendicular to the base surface. In the perpendicular magnetic recording type, compared with a conventional in-plane recording type, it is possible to more suppress a so-called thermal fluctuation phenomenon, in which thermal stability of a recording signal is impaired because of a superparamagnetic phenomenon to cause the recording signal to be lost, and therefore the perpendicular magnetic recording type is suitable for increasing the recording density.

As a magnetic recording medium for use in the perpendicular magnetic recording type, a CoCrPt—$SiO_2$ perpendicular magnetic recording medium (refer to Non-Patent Document 1) has been suggested because of high thermal stability and excellent recording characteristic. This is to configure a granular structure in a magnetic recording layer in which a non-magnetic grain boundary part with segregation of $SiO_2$ is formed between magnetic particles in which a crystal with an hcp structure (a hexagonal close-packed crystal lattice) of Co continuously grows in a columnar shape, thereby achieving finer magnetic particles and an improvement of a coercive force Hc together. As the non-magnetic grain boundary (a non-magnetic portion between magnetic particles), using an oxide has been known and, for example, using any one of $SiO_2$, $Cr_2O_3$, TiO, $TiO_2$, and $Ta_2O_5$ has been suggested (Patent Document 1).

In the magnetic recording medium with such increased recording density as described above, a further improvement in recording density is demanded for the future. Various important factors for increasing recording density of the perpendicular magnetic recording medium include an improvement in magnetostatic characteristic, such as a coercive force Hc and a reversed magnetic domain nucleation magnetic field Hc; an improvement in electromagnetic conversion characteristic, such as an overwrite characteristic (OW characteristic) and an SNR (Signal to Noise Ratio); and narrowing of a track width. Among all, an improvement in SNR is important for reading and writing accurately at high speed even at a recording bit of a small area.

An improvement in SNR is achieved mainly by reducing noise in a magnetization transition region of the magnetic recording layer. Effective factors for reducing noise include an improvement in crystal orientation of the magnetic recording layer, making a finer particle diameter of each magnetic particle, and isolation of the magnetic particles. Among others, when isolation of magnetic particles are promoted, an exchange interaction is interrupted. Therefore, noise can be greatly reduced and the SNR can be significantly improved.

To this end, providing a ground layer under the magnetic recording layer has been tried. The ground layer has an hcp structure, and has an operation of growing a crystal with an hcp structure of the magnetic recording layer as a granular structure. Therefore, the orientation of the magnetic recording layer can be improved as the crystal orientation of the ground layer is higher, that is, a (0001) surface of the crystal of the ground layer is more parallel to the main surface of a disk base. A typical material of the ground layer is Ru.

PRIOR ART DOCUMENT

Patent Document

[Patent Document 1] Japanese Unexamined Patent Application Publication No. 2006-024346

Non-Patent Document 1

[Non-Patent Document 1] T. Oikawa et. al., IEEE Trans. Magn., vol. 38, 1976-1978 (2002)

DISCLOSURE OF INVENTION

Problems to be Solved by the Invention

With the aim of further reducing noise, the inventors have conceived an idea of a two-layer structure of the Ru ground layer described above. That is, in the Ru ground layer with a two-layer structure, a first ground layer on a side away from the magnetic recording layer is first formed by sputtering under an atmospheric gas at a predetermined pressure, and a second ground layer on a side near the magnetic recording layer is then formed by sputtering under an atmospheric gas at a pressure higher than the predetermined pressure. Then, in a target for use in forming the second ground layer, oxygen or an oxide is caused to be contained.

When the ground layer is configured as described above, the content of oxygen is increased stepwise from the first ground layer, the second ground layer, and the magnetic recording layer. That is, the content of a substance other than a substance that becomes a crystal particle in the ground layer or the magnetic recording layer is increased stepwise from the first ground layer to the magnetic recording layer. With this structure, separation of the crystal particles can be promoted stepwise (approximately continuously) from the first ground layer to the magnetic recording layer.

Also, as in the structure above, oxygen or an oxide is caused to be contained in the ground layer. Thus, in the ground layer, oxygen or an oxide (a substance other than crystal particles of Ru) is deposited at the boundary of the crystal particles of Ru, thereby promoting separation of the crystal particles of Ru. As a result, in the magnetic recording layer formed on the ground layer, crystal particles (magnetic particles) of the magnetic recording layer are deposited on the crystal particles of Ru in the ground layer and, on a boundary of oxygen (or an oxide) in the ground layer, oxygen (or an oxide) contained in the magnetic recording layer and having a high affinity with oxygen (or the oxide) forming that boundary is deposited to form a grain boundary. Therefore, deposition of the oxide in the magnetic recording layer to the grain boundary can be promoted, and a mixture of the oxide into the crystal particles in a columnar shape is reduced. With this, crystal orientation of the crystal particles in the magnetic recording layer is improved, and the coercive force Hc can be increased.

Furthermore, by causing oxygen or an oxide to be contained in the ground layer as described above, separating the crystal particles of Ru and making them finer can be promoted more than the case of the conventional ground layer not containing oxygen. Therefore, the crystal particles of the ground layer having a columnar shape become finer, the magnetic particles of the magnetic recording layer grow in a columnar shape on the surface of the fine ground layer to form a granular structure. Therefore, it is possible to promote finer magnetic particles of the magnetic recording layer and isolation of these magnetic particles.

Still further, by configuring the ground layer with two layers, that is, the first ground layer and the second ground layer as described above, advantages of the conventional ground layer having a two-layer structure can be obtained. That is, crystal orientation of the magnetic recording layer can be improved by the first ground layer, and the particle diameter of the magnetic particles of the magnetic recording layer can be made finer by the second ground layer.

However, while the second ground layer becomes rough to be of a granular type, its film density is low. Thus, its anticorrosion property is low, thereby disadvantageously causing corrosion. Corrosion is a phenomenon in which, typically, a metal, such as a cobalt, is deposited from a lower layer to form an oxide on the surface of a perpendicular magnetic recording medium. When corrosion occurs, data recorded at that position is lost and, due to a low amount of floating of the magnetic head, a crash failure may occur, possibly leading to a failure of a disk drive.

Also, the second ground layer has a low strength and also a low shock resistance. In the present perpendicular magnetic recording medium, films of ten layers or so are formed, and the second ground layer has a roughest structure.

In view of these problems, an object of the present invention is to provide a perpendicular magnetic recording recording medium including a ground layer that prevents corrosion, while achieving a primary object of promoting finer magnetic particles of a magnetic recording layer and isolation of these magnetic particles.

Means for Solving the Problems

The inventors have diligently studied to solve the problems above and completed the present invention by getting an idea that the ground layer is configured to have a three-layer structure and films are formed by sputtering under an atmosphere where a low pressure, a high pressure, and then a low pressure are applied in this order from a side away from the magnetic recording layer.

That is, to solve the problems above, a typical structure of the perpendicular magnetic recording medium according to the present invention includes, at least on a base: a magnetic recording layer on which a signal is recorded; a ground layer provided below the magnetic recording layer; a non-magnetic layer for controlling crystal orientation of the ground layer; and a soft magnetic layer provided below the non-magnetic layer, wherein the ground layer is configured to have three layers including, in an order from bottom, a first ground layer and a second ground layer that contain ruthenium, and a third ground layer that contains a metal, and a gas pressure at film formation by sputtering for the second ground layer is the highest among those for the three layers.

According to the structure above, compared with the rough second ground layer, the third ground layer at a low gas pressure at film formation has a high film density and becomes dense. This third ground layer stops an increase of the metal that may cause corrosion, thereby preventing corrosion. Also, with the film density of the third ground layer being increased, shock resistance is improved.

Furthermore, sputtering is performed for film formation under an atmosphere where a low pressure (the first ground layer), a high pressure (the second ground layer), and then a low pressure (the third ground layer) are applied in this order from a side away from the magnetic recording layer. With this, operations when the ground layer has a two-layer structure are still kept, that is, crystal orientation of the magnetic recording layer can be improved with the first ground layer and the particle diameter of the magnetic particles of the magnetic recording layer can be made finer with the second ground layer.

The metal contained in the third ground layer described above preferably has an hcp structure (a hexagonal close-packed crystal lattice). The reason for this is that, as with the first and second ground layers, the third ground layer has an hcp structure to have an operation of growing a crystal with an hcp structure of Co in the magnetic recording layer as a granular structure.

The metal contained in the third ground layer described above is preferably selected from ruthenium, a chromium-tantalum alloy, and a chromium-titanium alloy. With these materials not containing an oxide, the third ground layer is made as a high-density metal layer and can prevent corrosion. Among others, as with the first and second ground layers, ruthenium is preferably used. The reason for this is that ruthenium has an hcp structure, has an interatomic distance in a crystal close to that of Co, and can cause the magnetic recording layer 122 containing Co as a main component to be nicely oriented.

The gas pressures at film formation described above are, preferably, substantially 1 Pa for the first ground layer, 3.5 Pa for the second ground layer, and 0.5 Pa to 0.6 Pa for the third ground layer. The third ground layer described above preferably has a film thickness of 1 nm to 1.5 nm.

Effect of the Invention

According to the present invention, a perpendicular magnetic recording medium including a ground layer that prevents corrosion can be provided, while achieving a primary object of promoting finer magnetic particles of a magnetic recording layer isolation of these magnetic particles.

BEST MODE FOR CARRYING OUT THE INVENTION

In the following, with reference to the attached drawings, a preferred embodiment of the present invention is described in detail. The dimensions, materials, and others such as specific numerical values shown in this embodiment are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

Embodiment

Perpendicular Magnetic Recording Medium

Figure 1:
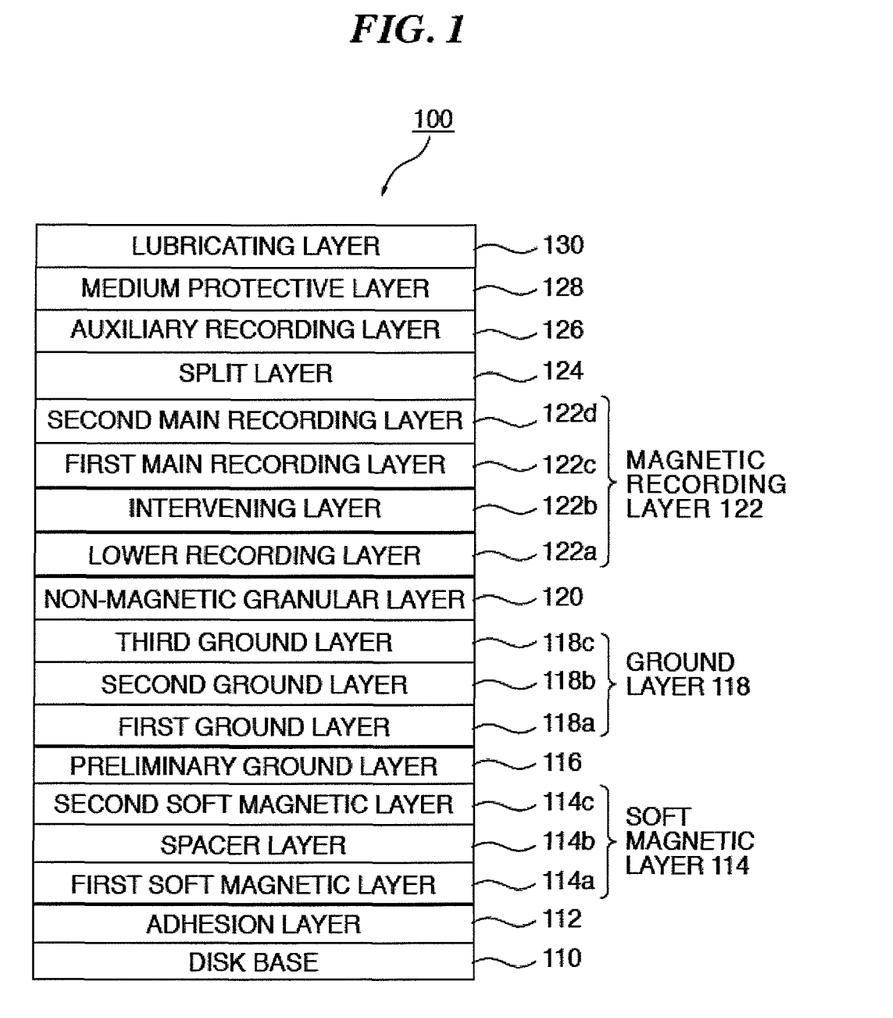
FIG. 1 A drawing for describing the structure of a perpendicular magnetic recording medium according to an embodiment.

FIG. 1 is a drawing for describing the structure of a perpendicular magnetic recording medium 100 according to the present embodiment. The perpendicular magnetic recording medium 100 depicted in FIG. 1 includes a disk base 110, an adhesion layer 112, a first soft magnetic layer 114a, a spacer layer 114b, a second soft magnetic layer 114c, a preliminary ground layer 116 (non-magnetic layer), a first ground layer 118a, a second ground layer 118b, a third ground layer 118c, a non-magnetic granular layer 120, a lower recording layer 122a, an intervening layer 122b, a first main recording layer 122c, a second main recording layer 122d, a split layer 124, an auxiliary recording layer 126, a medium protective layer 128, and a lubricating layer 130. Note that the first soft magnetic layer 114a, the spacer layer 114b, the second soft magnetic layer 114c together form a soft magnetic layer 114. The first ground layer 118a, the second ground layer 118b, and the third ground layer 118c together form a ground layer 118. The lower recording layer 112a, the intervening layer 122b, the first main recording layer 122c, and the second main recording layer 122d together form a magnetic recording layer 122.

As the disk base 110, a glass disk formed by molding an amorphous aluminosilicate glass in a disk form by direct pressing can be used. Note that the type, size, thickness, and others of the glass disk are not particularly restrictive. As a material of the glass disk, for example, an aluminosilicate glass, a soda lime glass, a soda aluminosilicate glass, an aluminoborosilicate glass, a borosilicate glass, a quartz glass, a chain silicate glass, or a glass ceramic, such as a crystallized glass, is used. On this glass disk, grinding, polishing, and chemical strengthening are sequentially performed, and the smooth non-magnetic disk base 110 formed of the chemically-strengthened glass disk can be obtained.

On the disk base 110, the adhesion layer 112 to the auxiliary recording layer 126 are sequentially formed by DC magnetron sputtering, and the medium protective layer 128 can be formed by CVD. Then, the lubricating layer 130 can be formed by dip coating. Note that it is also preferable to use an inline-type film forming method in view of high productivity. The structure of each layer is described below.

The adhesion layer 112 is formed in contact with the disk base 110, including a function of increasing a peel strength between the soft magnetic layer 114 and the disk base 110 formed on the adhesion layer and a function of making crystal grains of each layer formed on the soft magnetic layer 114 finer and uniform. When the disk base 110 is formed of an amorphous glass, the adhesion layer 112 is preferably an amorphous alloy film so as to correspond to the surface of the amorphous glass.

As the adhesion layer 112, for example, it is possible to select from a CrTi-type amorphous layer, a CoW-type amorphous layer, a CrW-type amorphous layer, a CrTa-type amorphous layer, and a CrNb-type amorphous layer. The adhesion layer 112 may be a monolayer formed of a single material, or may be formed by laminating a plurality of layers. For example, a CoW layer or a CrW layer may be formed on the CrTi layer. Also, the adhesion layer 112 selected from those above is preferably formed by sputtering with a material containing carbon dioxide, carbon monoxide, nitrogen, or oxygen or exposing a surface layer with a gas of any of the above.

The soft magnetic layer 114 is a layer for temporarily forming a magnetic path at recording in order to let a magnetic flux pass through the recording layer in a perpendicular direction in the perpendicular magnetic recording type. The soft magnetic layer 114 can be configured to include AFC (AntiFerromagnetic exchange Coupling) by interposing the non-magnetic spacer layer 114b between the first soft magnetic layer 114a and the second soft magnetic layer 114c. With this, the magnetizing direction of the soft magnetic layer 114 can be aligned with high accuracy along the magnetic path (a magnetic circuit). With this, perpendicular components in the magnetizing direction is extremely decreased, thereby reducing noise occurring from the soft magnetic layer 114. As the compositions of the first soft magnetic layer 114a and the second soft magnetic layer 114c, a cobalt-type alloy, such as a CoTaZr; a Co—Fe-type alloy, such as CoCrFeB or CoFeTaZr; or a Ni—Fe-type alloy, such as a [Ni—Fe/Sn]n multilayered structure can be used.

The preliminary ground layer 116 is a non-magnetic layer, that is, a non-magnetic alloy layer, including an operation of protecting the soft magnetic layer 114 and an operation of promoting alignment of orientation of crystal grains of the ground layer 118. As a material of the preliminary ground layer 116, specifically, it is possible to select from Ni, Cu, Pt, Pd, Zr, Hf, and Nb.

With this, roughness of each boundary surface among a plurality of layers formed on the soft magnetic layer 114 is mitigated, and crystal orientation of these layers can be improved. Therefore, an improvement in SNR and an increase in recording density can be achieved.

The ground layer 118 has an hcp structure, and has an operation of growing a crystal with an hcp structure of Co in the magnetic recording layer 122 as a granular structure. Therefore, the orientation of the magnetic recording layer 122 can be improved as the crystal orientation of the ground layer 118 is higher, that is, as a (0001) surface of the crystal of the ground layer 118 is more parallel to the main surface of a disk base. A typical material of the ground layer 118 is Ru. Other than that, it is possible to select from RuCr and RuCo. Ru has an hcp structure, has an interatomic distance in a crystal close to that of Co, and thus can cause the magnetic recording layer 122 containing Co as a main component to be nicely oriented.

When Ru is used as the ground layer 118, by changing a gas pressure at sputtering, a three-layer structure made of Ru can be formed. Specifically, the gas pressure at film formation by sputtering for the second ground layer 118b is the highest among those for the three layers. That is, film formation is performed by sputtering under an atmosphere where a low pressure (the first ground layer 118a), a high pressure (the second ground layer 118b is formed at 3.5 Pa), and then a low pressure (the third ground layer 118c is formed at 0.5 Pa to 0.6 Pa) are applied in this order from a side away from the magnetic recording layer. In the present embodiment, it is assumed that the third ground layer 118c has a film thickness of 1 nm to 1.5 nm.

As the gas pressure is increased, an average free path of a plasma ion to be sputtered is shortened, thereby causing a slow film formation speed and making the coating rough.

With this, making the crystal particles of Ru more separable and finer can be promoted, and the crystal particles of Co can also be made finer.

Furthermore, in the present embodiment, a small amount of oxygen is caused to be contained in Ru of the second ground layer 118b to configure RuO. Alternatively, a small amount of oxide is caused to be contained in Ru of the second ground layer 118b. As an oxide, for example, $SiO_2$, $TiO_2$, $Cr_2O_3$, $Ta_2O_5$, $WO_3$, CoO, or $Co_3O_4$ may be used. The reason for this is that, with this, making the crystal particles of Ru more separable and finer can be promoted, and making the magnetic recording layer 122 finer and further isolation thereof can be achieved. Note that although oxygen may be caused to be contained by reactive sputter, a target containing oxygen or an oxide is preferably used at film formation by sputtering.

On the other hand, oxygen is not caused to be contained in the third ground layer 118c. The reason for this is that with no oxide caused to be contained in the third ground layer, the third ground layer can be made as a high-density metal layer to prevent corrosion.

Figure 2:
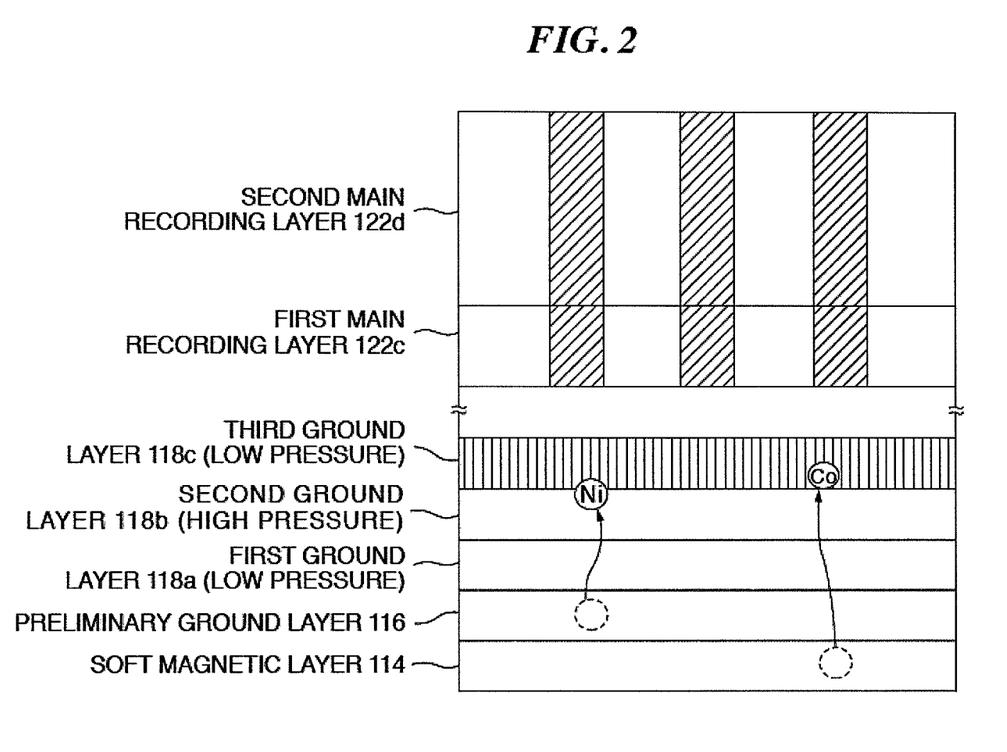
FIG. 2 A schematic view obtained by partially enlarging FIG. 1, showing the state in which a third ground layer stops a metal that may cause corrosion trying to ascend from a lower layer.

FIG. 2 is a schematic view obtained by partially enlarging FIG. 1, showing the state in which the third ground layer 118c stops a metal that may cause corrosion trying to ascend from a lower layer. As depicted in FIG. 2, examples of a cause of corrosion include Co ascending from the soft magnetic layer 114 and Ni ascending from the preliminary ground layer 116. Compared with the rough second ground layer 118b, the third ground layer 118 with a lower gas pressure at film formation has a higher film density and becomes dense. Since this third ground layer 118c stops an ascent of the metal that may cause corrosion, corrosion can be prevented. Also, by increasing the film density of the third ground layer 118c, shock resistance is also improved.

Also, the operations of the conventional two-layer structure including an improvement in crystal orientation of the magnetic recording layer 122 with the use of the first ground layer 118a and making the particle diameter of each magnetic particle of the magnetic recording layer 122 finer with the use of the second ground layer 118b can be kept as they are.

The metal contained in the third ground layer 118c has a hcp structure (a hexagonal close-packed crystal lattice). In the present embodiment, as with the first and second ground layers 118a and 118b, the third ground layer 118c is also made of ruthenium. The reason for this is that ruthenium has an hcp structure, has an interatomic distance in a crystal close to that of Co, and can cause the magnetic recording layer 122 containing Co as a main component to be nicely oriented.

Note that as the third ground layer 118, a chromium-tantalum alloy or a chromium-titanium alloy may be selected. The reason for this is that, with these materials not containing an oxide, the third ground layer is made as a high-density metal layer and can prevent corrosion.

The non-magnetic granular layer 120 has a non-magnetic layer having a granular structure. On the hcp crystal structure of the ground layer 118, the non-magnetic granular layer 120 is formed, above which a granular layer of the lower recording layer 122a (that is, the entire magnetic recording layer 122) is grown. With this, the non-magnetic granular layer has an operation of separating the magnetic granular layer from a stage of initial growth (start-up). With this, isolation of magnetic particles of the magnetic recording layer 122 can be promoted. The composition of the non-magnetic granular layer 120 can have a granular structure by causing a non-magnetic substance to be subjected to segregation between non-magnetic crystal particles made of a Co-type alloy to form a grain boundary.

In the present embodiment, CoCr—$SiO_2$ is used for this non-magnetic granular layer 120. With this, $SiO_2$ (non-magnetic substance) is subjected to segregation between the Co-type alloy (non-magnetic crystal particles) to form a grain boundary, thereby causing the non-magnetic granular layer 120 to have a granular structure. Note that CoCr—$SiO_2$ is merely an example, and is not meant to be restrictive. Other than that, CoCrRu—$SiO_2$ can be suitably used. Furthermore, in place of Ru, Rh (rhodium), Pd (palladium), Ag (silver), Os (osmium), Ir (iridium), or Au (gold) can be used. Still further, a non-magnetic substance is a substance that can cause a grain boundary part to be formed around magnetic particles so as to suppress or interrupt an exchange interaction operation between the magnetic particles (magnetic grains), and is a non-magnetic substance as long as it does not allow solid solution with cobalt (Co). Examples can include silicon oxide ($SiO_x$), chromium (Cr), chromium oxide ($Cr_2O_3$), titanium oxide ($TiO_2$), zircon oxide ($ZrO_2$), and tantalum oxide ($Ta_2O_5$).

In the present embodiment, the non-magnetic granular layer 120 is provided above the ground layer 188 (the second ground layer 188b). This is not meant to be restrictive, and the perpendicular magnetic recording medium 100 can be configured without the non-magnetic granular layer 120.

The magnetic recording layer 122 has a granular structure in a columnar shape in which a non-magnetic substance is subjected to segregation around magnetic particles of a hard magnetic substance selected from a Co-type alloy, a Fe-type alloy, and a Ni-type alloy to form a ground boundary. With the provision of the non-magnetic granular layer 120, these magnetic particles can make an epitaxial growth continuously from the granular structure. In the present embodiment, the magnetic recording layer 122 include the lower recording layer 122a, the intervening layer 122b, the first main recording layer 122c, and the second main recording layer 122d. With this, small crystal particles of the first main recording layer 122c and the second main recording layer 122d grow continuously from the crystal particles (magnetic particles) of the lower recording layer 122a, thereby making the main recording layer further finer and improving the SNR.

In the present embodiment, CoCrPt—$Cr_2O_5$—$SiO_2$ is used for the lower recording layer 112a. In CoCrPt—$Cr_2O_5$—$SiO_2$, a granular structure is formed in which $Cr_2O_5$ and $SiO_2$ (oxides), which are non-magnetic substances, are subjected to segregation around magnetic particles (grains) made of CoCrPt to form a ground boundary and magnetic particles grow in a columnar shape. These magnetic particles are formed by epitaxially growing continuously from the granular structure of the non-magnetic granular layer 120.

The intervening layer 112b is a non-magnetic thin film. By interposing the intervening layer between the lower recording layer 122a and the first main recording layer 122c, magnetic continuity among these is divided. Here, by setting the film thickness of the intervening layer 112b at a predetermined film thickness (0.7 nm 0.9 nm), AntiFerromagnetic exchange Coupling (AFC) occurs between the lower recording layer 122a and the first main recording layer 122c. With this, magnetizations attract each other between layers above and below the intervening layer 122b, and act so as to mutually fix the magnetizing direction, thereby reducing fluctuations of the axis of magnetization and also reducing noise.

The intervening layer 112b is preferably configured of Ru or a Ru compound. When Ru is configured of magnetic particles an interatomic distance is close to that of Co. Thus, even when the intervening layer is interpose to the magnetic recording layers 122, epitaxial growth of the crystal particles of Co is less prone to being inhibited. Also, when the intervening layer 122*b* has an extremely thin thickness, epitaxial growth is less prone to being inhibited.

Here, the lower recording layer 122*a* would be a magnet continuously from the first main recording layer 122*c* and the second main recording layer 122*d* if it were not for the intervening layer 122*b*, but becomes an individual short magnet because it is divided by the intervening layer 122*b*. And furthermore, by making the film thickness of the lower recording layer 122*a* thinner, the aspect ratio of each granular magnetic particle becomes shorter (in the perpendicular magnetic recording medium, the film thickness direction corresponds to a vertical direction of the axis of easy magnetization). Therefore, a demagnetizing field occurring inside the magnet becomes strong. Thus, although the lower recording layer 122*a* has hard magnetism, its magnetic moment produced to the outside is small and is less prone to being picked up by the magnetic head. That is, by adjusting the film thickness of the lower recording layer 122*a*, the magnetic moment (strength of the magnet) is set so that the magnetic flux is difficult to reach the magnetic head but a magnetic interaction acts on the first main recording layer 122*c*, thereby making a magnetic recording layer with less noise while achieving a high coercive force.

In the present embodiment, CoCrPt—$SiO_2$—$TiO_2$ is used for the first main recording layer 122*c*. With this, also in the first main recording layer 122*c*, a granular structure is formed in which $SiO_2$ and $TiO_2$ (composite oxide), which are non-magnetic substances, are subjected to segregation around magnetic particles (grains) made of CoCrPt to form a ground boundary and magnetic particles grow in a columnar shape.

Also, in the present embodiment, the second main recording layer 122*d* continues from the first main recording layer 122*c*, but is different therefrom in composition and film thickness. For the second main recording layer 122*d*, CoCrPt—$SiO_2$—$TiO_2$—$Co_3O_4$ is used. With this, even in the second main recording layer 122*d*, $SiO_2$, $TiO_2$, $Co_3O_4$ (composite oxide), which are non-magnetic substances, are subjected to segregation around the magnetic particles (grains) made of CoCrPt to form a grain boundary, thereby forming a granular structure in which magnetic particles grow in a columnar shape.

As described above, in the present embodiment, the second main recording layer 122*d* is configured to contain more oxides than the first main recording layer 122*c*. With this, from the first main recording layer 122*c* to the second main recording layer 122*d*, separation of crystal particles can be promoted stepwise.

Also as described above, a Co oxide is contained in the second main recording layer 122*d*. Due to the fact that oxygen loss occurs when $SiO_2$ or $TiO_2$ is mixed as an oxide, an Si ion or a Ti ion is mixed into the magnetic particles to disturb crystal orientation, thereby decreasing the coercive force Hc. To get around this, by causing an Co oxide to be contained, the second main recording layer can become functioning as an oxygen carrier for compensating for this oxygen loss. An example of the Co oxide is $Co_3O_4$, and CoO may be used.

The Co oxide has a Gibbs free energy ΔG larger that that of $SiO_2$ or $TiO_2$, and a Co ion and an oxygen ion tend to be separated. Therefore, oxygen is separated from the Co oxide with priority to compensate for an oxygen loss occurring in $SiO_2$ or $TiO_2$ to complete ions of Si or Ti as an oxide and deposit it to the grain boundary. With this, foreign substances, such as Si and Ti, can be prevented from being mixed into the magnetic particles, thereby preventing disturbance of crystallinity of the magnetic particles due to the mixture. Here, superfluous Co ions are thought to be mixed into the magnetic particles, but since the magnetic particles themselves are made of a Co alloy, the magnetic characteristic is not impaired. Therefore, crystallinity and crystal orientation of the magnetic particles are improved, and the coercive force H can be increased. Also, with an improvement in saturation magnetization Ms, the overwrite characteristic is also advantageously improved.

However, when the Co oxide is mixed in the magnetic recording layer, the SNR is disadvantageously decreased. To get around this, as described above, the first main recording layer 122*c* preventing mixture of the Co oxide is provided, thereby obtaining a high coercive force Hc and overwrite characteristic in the second main recording layer 122*d* while ensuring a high SNR in the first main recording layer 122*c*. Note that the film thickness of the second main recording layer 122*d* is preferably thicker than the film thickness of the first main recording layer 122*c*. As a suitable example, the first main recording layer 122*c* can have a film thickness of 2 nm and the second main recording layer 122*d* can have a film thickness of 8 nm.

Note that the substances for use in the lower recording layer 122*a*, the first main recording layer 122*c*, and the second main recording layer 122*d* described above are merely examples, and are not meant to be restrictive. As a non-magnetic substance for forming a grain boundary, examples of oxides can include silicon oxide ($SiO_x$), chromium (Cr), chromium oxide ($Cr_xO_y$), titanium oxide ($TiO_2$), zircon oxide ($ZrO_2$), tantalum oxide ($Ta_2O_5$), iron oxide ($Fe_2O_3$), and boron oxide ($B_2O_3$). Also, a nitride, such as BN and a carbide, such as $B_4C_3$, can be suitably used.

Furthermore, in the present embodiment, non-magnetic substance (oxides) of two types are used in the lower recording layer 122*a* and the first main recording layer 122*c*, and those of three types are used in the second main recording layer 122*d*, but this is not meant to be restrictive. For example, a non-magnetic substance of one type may be used for any or all of the lower recording layer 122*a* to the second main recording layer 122*d*, or non-magnetic substances of two types or more can be used in combination. Here, although the types of non-magnetic substance are not limited, $SiO_2$ and $TiO_2$ are preferably contained as in the present embodiment. Therefore, unlike the present embodiment, when the lower recording layer 122*a* to the second main recording layer 122*d* are configured as one layer (when the intervening layer 122*b* is not provided), this magnetic recording layer is preferably made of CoCrPt—$SiO_2$—$TiO_2$.

The split layer 124 is a non-magnetic layer provided between the magnetic recording layer 122 (the second main recording layer 122*d*) and the auxiliary recording layer 126. However, the split layer 124 is formed thicker than the intervening layer 122*b*. With this, instead of antiferromagnetic exchange coupling, ferromagnetic exchange coupling occurs between the magnetic recording layer 122 and the auxiliary recording layer 126 as a magnetic effect.

Also in the present embodiment, the split layer 124 can be configured of a thin film containing Ru, a Ru compound, Ru and oxygen, or Ru and an oxide. This can also reduce noise due to the auxiliary recording layer 126. The reason for this is thought to be that, when the split layer 124 is formed, oxygen contained in the split layer 124 is subjected to segregation on the oxide of the magnetic recording layer 122 and Ru is subjected to segregation on the magnetic particles, thereby allowing the crystal structure of Co in the magnetic recording layer 122 to be inherited to Co in the auxiliary recording layer 126.

Various oxides to be caused to be contained in Ru in the split layer 124 can be thought. In particular, by using an oxide of W, Ti, or Ru, an electromagnetic conversion characteristic (SNR) can be improved. For example, the split layer 124 may be of RuO, RuWO$_3$, or RuTiO$_2$. Among all, WO$_3$ can achieve an excellent effect.

The reason for this is though to be that oxygen or the oxide contained in Ru is dissociated during sputtering and dissociated oxygen shows an effect of addition of oxygen. That is, with the use of WO$_3$, an effect of addition of oxygen and an effect of addition of an oxide can be both suitably achieved. Other examples of oxides can include silicon oxide (SiO$_x$), chromium (Cr), chromium oxide (Cr$_x$O$_Y$), titanium oxide (TiO$_2$), zircon oxide (ZrO$_2$), tantalum oxide (Ta$_2$O$_5$), iron oxide (Fe$_2$O$_3$), and boron oxide (B$_2$O$_3$). Also, a nitride, such as BN and a carbide, such as B$_4$C$_3$, can be suitably used.

In the present embodiment, the auxiliary recording layer 126 is a magnetic layer approximately magnetically continuing in an in-plane direction of the main surface of the base. The auxiliary recording layer 126 is required to be adjacent to or near the magnetic recording layer 122 so as to have a magnetic interaction therewith. As a material of the auxiliary recording layer 126, for example, CoCrPt, CoCrPtB, or a material configured by causing a slight amount of oxide to be contained in any of these can be used. An object of the auxiliary recording layer 126 is to adjust a reversed magnetic domain nucleation magnetic field Hn and adjust the coercive force Hc, thereby improving resistance to heat fluctuations, OW characteristic, and SNR. To achieve this object, the auxiliary recording layer 126 preferably has high perpendicular magnetic anisotropy Ku and saturation magnetization Ms. Note that, although the auxiliary recording layer 126 is provided above the magnetic recording layer 122 in the present embodiment, it may be provided therebelow.

Note that "magnetically continuing" means that magnetization continues, and "approximately continuing" means the auxiliary recording layer 126 is not necessarily a single magnet when observed as a whole and the magnetism may be partially discontinuous in the grain boundary of the crystal particles and others. In the grain boundary, the crystal may be not only discontinuous but also Cr may be subjected to segregation. Furthermore, a slight amount of oxide may be contained for segregation. However, even when a grain boundary containing an oxide in the auxiliary recording layer 126 is formed, the grain boundary preferably has an area (an amount of oxide content) smaller than that of the ground boundary of the magnetic recording layer 122. Although the function and operation of the auxiliary recording layer 126 are not necessarily clear, it is thought that the auxiliary recording layer 126 has a magnetic interaction (performs exchange coupling) with the granular magnetic particles of the magnetic recording layer 122, thereby adjusting Hn and Hc and improving resistant to heat fluctuations and the SNR. Also, it can be thought that the crystal particles connected to the granular magnetic particles (crystal particles having a magnetic interaction) have a section larger than the section of the granular magnetic particles, and thus receive more magnetic fluxes from the magnetic head to become prone to flux reversal, thereby improving an overall OW characteristic.

The medium protective layer 128 can be formed by forming a film of carbon by CVD with vacuum being kept. The medium protective layer 128 is a layer for protecting the perpendicular magnetic recording medium 100 from a shock of the magnetic head. In general, a carbon film formed by CVD has a film hardness improved compared with those formed by sputtering, and therefore the perpendicular magnetic recording medium 100 can be effectively protected from a shock from the magnetic head.

The lubricating layer 130 can be formed by dip coating with the use of PFPE (perfluoropolyether). PFPE has a long-chain-shaped molecular structure, and couples an N atom on the surface of the medium protective layer 128 with a high affinity. With this operation of the lubricating layer 130, even when the magnetic head makes contact with the surface of the perpendicular magnetic recording medium 100, damage and loss of the medium protective layer 128 can be prevented.

With the manufacturing process described above, the perpendicular magnetic recording medium 100 can be obtained. Next, examples of the present invention are described.

Examples

On the disk base 110, by using a vacuumed film forming device, the adhesion layer 112 to the auxiliary recording layer 126 were sequentially formed in an Ar atmosphere by DC magnetron sputtering. The adhesion layer 112 was made of CrTi. In the soft magnetic layer 114, the compositions of the first soft magnetic layer 114a and the second soft magnetic layer 114c were made of CoFeTaZr, and the composition of the spacer layer 114 was made of Ru. The second ground layer 118b was formed as a Ru (RuO) film containing oxygen by forming a film under an Ar atmosphere at a high pressure (3.5 Pa) using a target containing oxygen. As with the first ground layer 118a, the third ground layer 118c was formed as a Ru film under an Ar atmosphere using a target without containing oxygen, but the gas pressure was lowest, that is, 0.5 Pa to 0.6 Pa.

The medium protective layer 128 was formed by CVD with the use of C$_2$H$_4$ and CN, and the lubricating layer 130 was formed by dip coating with the use of PFPE.

Figure 3:
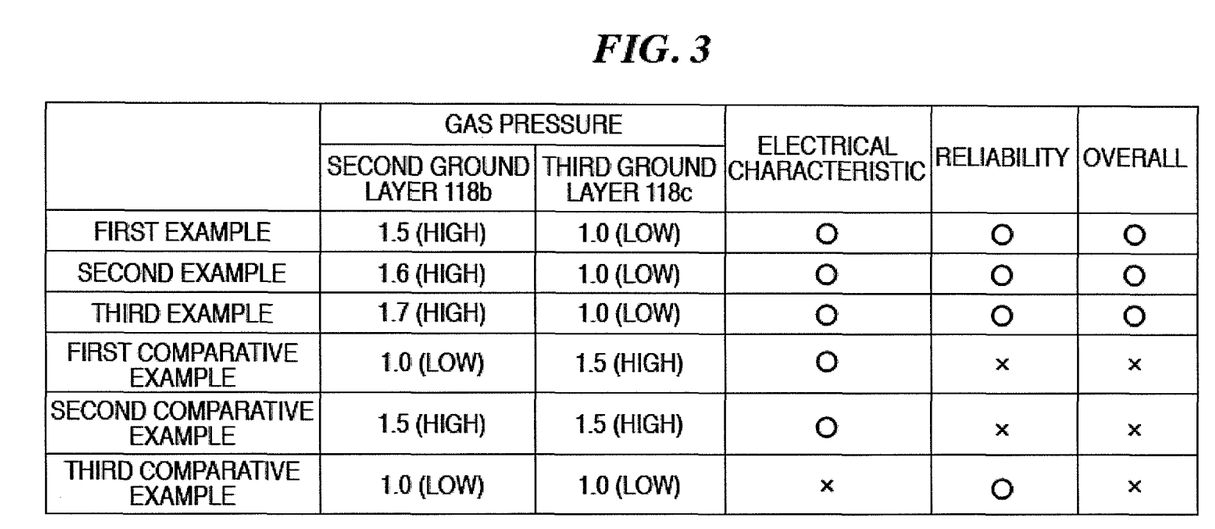
FIG. 3 A drawing that shows evaluation results of examples and comparative examples.

FIG. 3 is a drawing that shows evaluation results of examples and comparative examples. Compared with first to third comparative examples, it can be found that first to third examples at a lower gas pressure at sputtering film formation of the second ground layer 118b to the third ground layer 118c are excellent in electrical characteristics, such as the coercive force Hc and the SNR, and are excellent in reliability because no disk crash occurs due to corrosion, thereby being highly regarded overall.

As for gas pressures, in general, 1.0 Pa or lower is regarded as a low value, and 1.5 Pa or higher is regarded as a high value. As described above, in each example where a gas pressure at film formation of the second ground layer 118b has a high value and a gas pressure at film formation of the third ground layer 118c has a low value, excellent results were obtained. By contrast, in each comparative embodiment where gas pressures different from those described above are combined, excellent results were not be able to be obtained.

Note that the gas pressure at sputtering film formation of the first ground layer 118a is lower than that of the second ground layer 118b and has a common value, and therefore it is omitted in FIG. 3.

In the foregoing, the preferred example of the present invention has been described with reference to the attached drawings. Needless to say, however, the present invention is not restricted by this embodiments. It is clear that the person skilled in the art can conceive various modification examples or corrected examples within a range described in the scope of claims for patent, and it is understood that these examples reasonably belong to the technological scope of the present invention.

INDUSTRIAL APPLICABILITY

The present invention can be utilized as a perpendicular magnetic recording medium to be mounted on an HDD or the like of a perpendicular magnetic recording type.

DESCRIPTION OF REFERENCE NUMERALS

100 ... perpendicular magnetic recording medium
110 ... disk base
112 ... adhesion layer
114 ... soft magnetic layer
114a ... first soft magnetic layer
114b ... spacer layer
114c ... second soft magnetic layer
116 ... preliminary ground layer
118 ... ground layer
118a ... first ground layer
118b ... second ground layer
118c ... third ground layer
120 ... non-magnetic granular layer
122 ... magnetic recording layer
122a ... lower recording layer
122b ... intervening layer
122c ... first main recording layer
122d ... second main recording layer
124 ... split layer
126 ... auxiliary recording layer
128 ... medium protective layer
130 ... lubricating layer

The invention claimed is:

1. A perpendicular magnetic recording medium comprising:
   a base;
   a magnetic recording layer formed on the base and on which a signal is recorded;
   a ground layer provided below the magnetic recording layer;
   a non-magnetic granular layer disposed between the magnetic recording layer and the ground layer for controlling crystal orientation of the ground layer; and
   a soft magnetic layer provided below the ground layer,
   wherein the ground layer is configured to have three layers including, in an order from the base, a first ground layer that contains ruthenium, a second ground layer that contains ruthenium, the second ground layer having crystal particles finer than those of the first ground layer, and a third ground layer that contains a metal and no oxygen, and
   a gas pressure at film formation by sputtering for the second ground layer is the highest among those for the three layers, thereby providing a finer crystal structure in the second ground layer than in the first ground layer or third ground layer,
   wherein the non-magnetic granular layer has a chemical composition different from said third ground layer.

2. The perpendicular magnetic recording medium according to claim 1, wherein
   the metal contained in the third ground layer has a hcp structure (a hexagonal close-packed crystal lattice).

3. A perpendicular magnetic recording medium comprising:
   a base;
   a magnetic recording layer formed on the base and on which a signal is recorded;
   a ground layer provided below the magnetic recording layer;
   a non-magnetic granular layer disposed between the magnetic recording layer and the ground layer for controlling crystal orientation of the ground layer; and
   a soft magnetic layer provided below the ground layer,
   wherein
   the ground layer is configured to have three layers including, in an order from the base, a first ground layer and a second ground layer that both contain ruthenium, the second ground layer having crystal particles finer than those of the first ground layer, and a third ground layer that contains a metal, and
   a gas pressure at film formation by sputtering for the second ground layer is the highest among those for the three layers,
   wherein the non-magnetic granular layer has a chemical composition different from said third ground layer,
   wherein the metal contained in the third ground layer is selected from ruthenium, a chromium-tantalum alloy, and a chromium-titanium alloy and the third ground layer contains no oxygen.

4. A perpendicular magnetic recording medium comprising:
   a base;
   a magnetic recording layer formed on the base and on which a signal is recorded;
   a ground layer provided below the magnetic recording layer;
   a non-magnetic granular layer disposed between the magnetic recording layer and the ground layer for controlling crystal orientation of the ground layer; and
   a soft magnetic layer provided below the ground layer,
   wherein
   the ground layer is configured to have three layers including, in an order from the base, a first ground layer and a second ground layer that both contain ruthenium, the second ground layer having crystal particles finer than those of the first ground layer, and a third ground layer that contains a metal, and
   a gas pressure at film formation by sputtering for the second ground layer is the highest among those for the three layers,
   wherein the non-magnetic granular layer has a chemical composition different from said third ground layer,
   wherein the gas pressures at film formation are 1 Pa for the first ground layer, 3.5 Pa for the second ground layer, and 0.5 Pa to 0.6 Pa for the third ground layer and the gas at film formation of the first ground layer and the third ground layer contains no oxygen.

5. A perpendicular magnetic recording medium comprising:
   a base;
   a magnetic recording layer formed on the base and on which a signal is recorded;
   a ground layer provided below the magnetic recording layer;
   a non-magnetic granular layer disposed between the magnetic recording layer and the ground layer for controlling crystal orientation of the ground layer; and
   a soft magnetic layer provided below the ground layer,
   wherein
   the ground layer is configured to have three layers including, in an order from the base, a first ground layer and a second ground layer that both contain ruthenium, the second ground layer having crystal particles finer than those of the first ground layer, and a third ground layer that contains a metal, and
   a gas pressure at film formation by sputtering for the second ground layer is the highest among those for the three layers,
   wherein the non-magnetic granular layer has a chemical composition different from said third ground layer,
   wherein the third ground layer has a film thickness of 1 nm to 1.5 nm.

6. The perpendicular magnetic recording medium according to claim 2, wherein
the gas pressures at film formation are 1 Pa for the first ground layer, 3.5 Pa for the second ground layer, and 0.5 Pa to 0.6 Pa for the third ground layer and the gas at film formation of the first ground layer and the third ground layer contains no oxygen.

7. The perpendicular magnetic recording medium according to claim 3, wherein
the gas pressures at film formation are 1 Pa for the first ground layer, 3.5 Pa for the second ground layer, and 0.5 Pa to 0.6 Pa for the third ground layer and the gas at film formation of the first ground layer and the third ground layer contains no oxygen.

8. The perpendicular magnetic recording medium according to claim 2, wherein
the third ground layer has a film thickness of 1 nm to 1.5 nm.

9. The perpendicular magnetic recording medium according to claim 3, wherein
the third ground layer has a film thickness of 1 nm to 1.5 nm.

10. The perpendicular magnetic recording medium according to claim 4, wherein
the third ground layer has a film thickness of 1 nm to 1.5 nm.

11. The perpendicular magnetic recording medium according to claim 6, wherein
the third ground layer has a film thickness of 1 nm to 1.5 nm.

12. The perpendicular magnetic recording medium according to claim 7, wherein
the third ground layer has a film thickness of 1 nm to 1.5 nm.

13. The perpendicular magnetic recording medium according to claim 1, wherein the second ground layer contains oxygen.

14. The perpendicular magnetic recording medium according to claim 3, wherein the second ground layer contains oxygen.

15. The perpendicular magnetic recording medium according to claim 4, wherein the gas at film formation of the second ground layer contains oxygen.

16. The perpendicular magnetic recording medium according to claim 6, wherein the gas at film formation of the second ground layer contains oxygen.

17. The perpendicular magnetic recording medium according to claim 7, wherein the gas at film formation of the second ground layer contains oxygen.

18. A perpendicular magnetic recording medium comprising:
a base;
a magnetic recording layer formed on the base and on which a signal is recorded;
a ground layer provided below the magnetic recording layer;
a non-magnetic layer disposed between the magnetic recording layer and the ground layer for controlling crystal orientation of the ground layer; and
a soft magnetic layer provided below the non-magnetic layer,
wherein
the ground layer is configured to have three layers including, in an order from the base, a first ground layer and a second ground layer that both contain ruthenium, and a third ground layer that contains a metal, and
a gas pressure at film formation by sputtering for the second ground layer is the highest among those for the three layers,
wherein the third ground layer has a density greater than a density of the second ground layer.

19. The perpendicular magnetic recording medium according to claim 1, wherein the non-magnetic granular layer comprises Si.

20. The perpendicular magnetic recording medium according to claim 1, wherein the non-magnetic granular layer comprises a substance selected from the group comprising SiOx, Cr, $Cr_2O_3$, $TiO_2$, $ZrO_2$ and $Ta_2O_5$.

21. The perpendicular magnetic recording medium according to claim 1, wherein the magnetic recording layer contains an oxide.

22. The perpendicular magnetic recording medium according to claim 1, wherein the non-magnetic granular layer contains no oxides.

23. The perpendicular magnetic recording medium according to claim 1, wherein the non-magnetic granular layer contains no ruthenium.

24. The perpendicular magnetic recording medium according to claim 5, wherein
the metal contained in the third ground layer has a hcp structure (a hexagonal close-packed crystal lattice).

25. The perpendicular magnetic recording medium according to claim 5, wherein
the metal contained in the third ground layer is selected from ruthenium, a chromium-tantalum alloy, and a chromium-titanium alloy and the third ground layer contains no oxygen.

26. The perpendicular magnetic recording medium according to claim 5, wherein
the gas pressures at film formation are 1 Pa for the first ground layer, 3.5 Pa for the second ground layer, and 0.5 Pa to 0.6 Pa for the third ground layer and the gas at film formation of the first ground layer and the third ground layer contains no oxygen.

* * * * *